US012792575B2

(12) United States Patent
Wong et al.

(10) Patent No.: US 12,792,575 B2
(45) Date of Patent: Nov. 10, 2026

(54) EFFICIENT ONLINE SCHEMA UPGRADE IN DISTRIBUTED DATABASES

(71) Applicant: Oracle International Corporation, Redwood Shores, CA (US)

(72) Inventors: Lik Wong, Palo Alto, CA (US); Leonid Novak, Castro Valley, CA (US); Sampanna Salunke, Dublin, CA (US); Mark Dilman, Sunnyvale, CA (US); Wei-Ming Hu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/820,858

(22) Filed: Aug. 30, 2024

(65) Prior Publication Data

US 2026/0064641 A1 Mar. 5, 2026

(51) Int. Cl.
*G06F 16/21* (2019.01)
*G06F 16/23* (2019.01)
*G06F 16/27* (2019.01)

(52) U.S. Cl.
CPC ........ *G06F 16/213* (2019.01); *G06F 16/2379* (2019.01); *G06F 16/27* (2019.01)

(58) Field of Classification Search
CPC ..... G06F 16/213; G06F 16/27; G06F 16/2379
See application file for complete search history.

(56) References Cited

U.S. PATENT DOCUMENTS 5,870,761 A 2/1999 Demers et al.
6,226,650 B1 5/2001 Mahajan
7,031,974 B1 * 4/2006 Subramaniam ......... G06F 16/27 707/999.102
7,570,451 B2 8/2009 Bedillion et al.
7,912,051 B1 3/2011 Rowlands et al.
8,306,947 B2 * 11/2012 Broeder .............. G06F 11/2094 707/613
8,473,953 B2 6/2013 Bourbonnais
(Continued)

OTHER PUBLICATIONS

U.S. Appl. No. 13/101,783, filed May 5, 2011, Notice of Allowance, Jan. 30, 2014.
(Continued)

*Primary Examiner* — Khanh B Pham
(74) *Attorney, Agent, or Firm* — Hickman Becker Bingham Ledesma LLP; Marcel K. Bingham

(57) ABSTRACT

A computer-implemented method includes performing a schema upgrade in a sharded database of a distributed system, by replacing in each shard a first version of a database schema with a second version of the database schema. The schema upgrade is performed for the first and second shards asynchronously, resulting in first and second versions of an application executing simultaneously with the first and second versions of the database schema respectively. The method also includes preventing execution of a change against a first shard on which the schema upgrade has been performed while the schema upgrade has not been performed on a second shard, in a case where the change is not compliant with the first version of the database schema. On completion of the schema upgrade in one of the shards, the upgraded schema becomes readable for an application using that shard.

28 Claims, 8 Drawing Sheets

400

(56) References Cited

U.S. PATENT DOCUMENTS

| | | | |
|---|---|---|---|
| 8,478,718 B1 | 7/2013 | Ranade | |
| 8,738,568 B2 | 5/2014 | Ghosh et al. | |
| 8,930,312 B1 | 1/2015 | Rath | |
| 9,026,679 B1 | 5/2015 | Shmuylovich | |
| 9,244,996 B2 | 1/2016 | Bourbonnais | |
| 9,767,138 B2 | 9/2017 | Jaiswal et al. | |
| 9,830,372 B2 | 11/2017 | Rajamani et al. | |
| 2002/0133507 A1 | 9/2002 | Holenstein | |
| 2002/0198899 A1 | 12/2002 | Yamaguchi et al. | |
| 2004/0199552 A1 | 10/2004 | Ward et al. | |
| 2005/0289186 A1* | 12/2005 | Guo | G06F 16/27 |
| 2006/0010130 A1 | 1/2006 | Leff et al. | |
| 2006/0047713 A1 | 3/2006 | Gornshtein | |
| 2007/0288530 A1 | 12/2007 | Romem et al. | |
| 2008/0005112 A1 | 1/2008 | Shavit | |
| 2008/0052322 A1 | 2/2008 | Gusciora | |
| 2008/0098044 A1 | 4/2008 | Todd | |
| 2010/0250491 A1 | 9/2010 | Jin et al. | |
| 2011/0173619 A1 | 7/2011 | Fish | |
| 2012/0185432 A1* | 7/2012 | Ding | G06F 16/273 707/E17.005 |
| 2012/0278282 A1 | 11/2012 | Lu | |
| 2012/0284228 A1 | 11/2012 | Ghosh | |
| 2013/0198133 A1 | 8/2013 | Lee | |
| 2013/0226870 A1 | 8/2013 | Dash | |
| 2014/0304229 A1* | 10/2014 | Zhu | G06F 16/00 707/634 |
| 2015/0032694 A1 | 1/2015 | Rajamani et al. | |
| 2015/0032695 A1 | 1/2015 | Tran et al. | |
| 2020/0142868 A1* | 5/2020 | Varadarajan | G06F 16/278 |
| 2023/0081900 A1* | 3/2023 | Werner | G06F 16/2379 707/703 |

OTHER PUBLICATIONS

U.S. Appl. No. 13/951,281, filed Jul. 25, 2013, Office Action, Jun. 2, 2015.

U.S. Appl. No. 13/951,281, filed Jul. 25, 2013, Notice of Allowance, Oct. 24, 2016.

U.S. Appl. No. 13/951,281, filed Jul. 25, 2013, Notice of Allowance, May 18, 2016.

U.S. Appl. No. 13/951,281, filed Jul. 25, 2013, Final Office Action, Jan. 6, 2016.

U.S. Appl. No. 13/950,207, filed Jul. 24, 2013, Office Action, Dec. 11, 2015.

U.S. Appl. No. 13/950,207, filed Jul. 24, 2013, Final Office Action, May 25, 2016.

Rajamani, U.S. Appl. No. 13/950,207, filed Jul. 24, 2013, Office Action, Dec. 29, 2016.

Rajamani, U.S. Appl. No. 13/950,207, filed Jul. 24, 2013, Notice of Allowance, Jul. 14, 2017.

Rajamani, U.S. Appl. No. 13/950,207, filed Jul. 24, 2013, Interview Summary, Apr. 18, 2017.

U.S. Appl. No. 13/101,783, filed May 5, 2011 Notice of Allowance 50277-3841, Sep. 25, 2012.

* cited by examiner

100

200

301
```
SQL> CREATE TABLE t (id NUMBER,  v_col varchar2(50),  n_col number,  d_col date);

Table created.
```

302
```
SQL>
SQL> INSERT INTO t (id, v_col, n_col, d_col) VALUES (1, 'vc0123456789012345678901234567',
2023089928, sysdate);

1 row created.
```

303
```
SQL>
SQL> -- Incompatible: v_col to char, existing data too large
SQL> ALTER TABLE t MODIFY v_col char(20);
ALTER TABLE t MODIFY v_col char(20)
ERROR at line 1:
ORA-01441: cannot decrease column length because some value is too big
```

304
```
SQL>
SQL> -- Compatible: v_col to char, existing data does not exceed new data length
SQL> ALTER TABLE t MODIFY v_col char(32);

Table altered.
```

305
```
SQL>
SQL> -- incompatible: number to varchar2
SQL> ALTER TABLE t MODIFY n_col varchar2(30);
ALTER TABLE t MODIFY n_col varchar2(30)
ERROR at line 1:
ORA-01439: column to be modified must be empty to change datatype
```

306
```
SQL>
SQL> -- incompatible: number to date
SQL> ALTER TABLE t MODIFY n_col date;
ALTER TABLE t MODIFY n_col date
ERROR at line 1:
ORA-01439: column to be modified must be empty to change datatype
```

307
```
SQL>
SQL> -- incompatible: date to varchar2
SQL> ALTER TABLE t MODIFY d_col varchar2(20);
ALTER TABLE t MODIFY d_col varchar2(20)
ERROR at line 1:
ORA-01439: column to be modified must be empty to change datatype
```

FIG. 3

EFFICIENT ONLINE SCHEMA UPGRADE IN DISTRIBUTED DATABASES

FIELD OF THE INVENTION

The present invention relates to computing using relational databases, and more particularly to a method and system for providing efficient online schema upgrades in distributed databases.

BACKGROUND

In asynchronous database replication, updates are made to a replica database and then asynchronously replicated at one or more other replica databases. Users of asynchronous replication require efficient and safe online schema upgrades that minimize the impact on the availability of the database system during the upgrade.

To meet this requirement, a schema upgrade may be performed using "rolling upgrades". In a rolling upgrade, schema upgrades are performed on a subset of the databases of a replicated database system and then another subset. The state of the database system between the initiation of the rolling upgrade and the completion of the upgrade on the replicated database system is referred to herein as the "schema upgrade window" or simply the "upgrade window".

A type of asynchronous database replication that supports online rolling upgrading relatively efficiently is uni-directional asynchronous database replication. In uni-directional asynchronous database replication, a primary database system managing a primary database sends a stream of changes to replicate ("replication stream") to a replica database system, which receives a replication stream from only one primary database system. The replication stream includes both data manipulation language (DML) changes to database user data and schema changes. The DML changes and schema changes are serialized within the replication stream in the relative order the changes occur. Thus, a replica database system will not have applied DML changes in a replication stream made according to a schema upgrade without first having encountered the schema upgrade in the replication stream and upgrading the replica accordingly. Having schema consistency between the schema under which DML changes in a replication stream are made and the schema of the replica to which the DML changes are applied when applied is referred to herein as schema congruency. In uni-directional asynchronous database replication, schema congruency is feasible to maintain because a replica database system encounters DML changes and schema changes from only one replication stream in a serialized order.

However, there are scenarios of asynchronous database replication where schema congruency cannot be feasibly maintained. One such scenario is bi-directional replication. In bi-directional replication, a DML change may be initially made at any of number of multiple databases and be replicated at any number of other replicas of the databases. A replication stream to replicate may flow from a particular database system to another database system, while another replication stream may flow from the other database system to the particular database system.

Performing an online rolling upgrade within a bi-directional replication system would require that the database systems execute under different versions of a schema while receiving one or more replication stream to apply from one or more other database systems. Under these conditions, maintaining schema congruency among the replication streams and the database systems is not feasible. For this reason, online rolling upgrades are not performed in database replication systems that use bi-directional replication.

The are other asynchronous replication scenarios in which schema congruency is infeasible to maintain. For example, a single replication database system may receive replication streams to replicate from multiple database systems. As shown above, it is desirable to develop novel techniques for performing rolling online upgrades where schema congruency cannot be maintained.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 3 shows examples of column data type modifications that can be performed without loss of data, in accordance with an embodiment of the disclosure.

DETAILED DESCRIPTION

Figure 1:
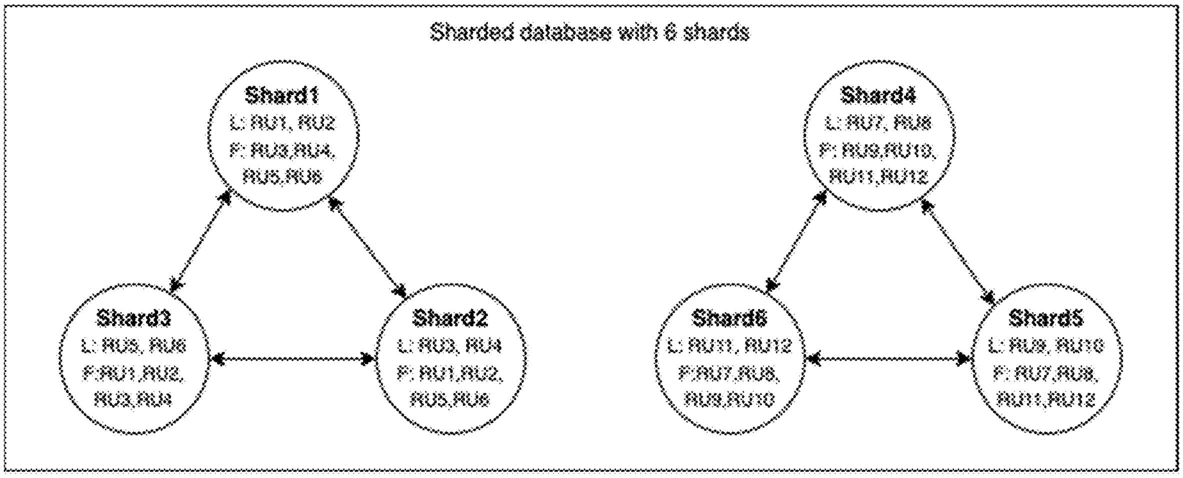
FIG. 1 schematically illustrates a database that includes shards, in which each shard performs online schema upgrades independently and asynchronously, in accordance with embodiments of the disclosure.

In the following description, for the purposes of explanation, numerous specific details are set forth in order to provide a thorough understanding of the present invention. It will be apparent, however, that the present invention may be practiced without these specific details.

1. General Overview

In accordance with aspects of the disclosure, approaches are described for performing online rolling upgrades in a replicated database system in scenarios where schema congruency does not have to be maintained. While the availability of the replicated database system is retained, the level of service may be reduced. A reduced level of service may mean that certain types of operations are not permitted, depending on the nature of the schema upgrade, as further described below.

The approaches are illustrated in the context of a replicated sharded database system that uses bi-directional replication, as further described herein. However, the approaches may be used for other kinds of database replication systems where schema congruency is not maintained.

A sharded database system uses horizontal partitioning of database objects, such as tables. Horizontal partitioning is a technique of decomposing the rows or records of a single larger database object into smaller subsets of rows or records. The subsets are referred to as partitions. Sharding is a data tier architecture where a database object is horizontally partitioned across independent database servers and where each independent database server is referred to as a "shard server" or "shard." A collection of shard servers, together, may be referred to as a sharded database management system (DBMS). Logically, a sharded DBMS can be accessible to a client application just like a traditional unsharded DBMS. However, database objects in a sharded database are horizontally partitioned across shards.

In a replicated sharded DBMS, any partition of a database object is replicated among a set of shard servers of a sharded DBMS. DML changes to that partition are made by a shard server ("leader" with respect to the partition) and are replicated to follower shard servers, which are shard servers hosting replicas of the partition.

Partitions of a database object may have different leaders. For a given database object with a first and second partition, one shard server may be a leader for the first partition but a follower for the second partition; another shard server may be a leader for the second partition but a follower for the first partition. Thus, for a given database object, different leaders may make DML changes to different partitions of the same database object.

During a schema upgrade window, two versions of a schema exists simultaneously. Thus, for a given database object, a DML change made by one leader of the database object may be made at an old version of the schema but propagated to a follower upgraded to the new version of the schema while a DML change made by another leader may be made at a new version of the schema but propagated to followers running at the old version of the schema.

The rolling upgrade approaches described herein ensures that DML changes to the old version of a database object will be transparently converted under certain conditions, so that the resulting DML changes will be correctly applied to the new version of the database object and vice versa. In addition, when DML changes are executed against a leader where the schema has been upgraded and a follower of the leader has not, the approaches prevent DML changes that are not compatible with the older schema.

2. Local Online Schema Upgrade

In various embodiments, as mentioned before, a shard server performs online schema upgrades independently and asynchronously with respect to other shards. Once the schema upgrade is finished within a shard, the updated schema becomes readable for applications using that particular shard.

In an embodiment, a sharded database is divided into units referred to as chunks. Each chunk includes one or more partitions from respective one or more database objects. The partitions of a database object may reside in respective chunks.

In a replicated sharded DBMS, each replica of a shard comprises replicas of chunks. Chunks are organized into replication units (RU). An RU includes a set of chunks that are replicated across a set of shard servers. Each RU has a single leader and a set of followers. The leader makes DML changes to respective chunk replicas hosted at the leader; the followers replicate the DML changes by applying the DML changes to respective chunk replicas.

A set of RUs may be hosted across a "ring" of shard servers. A ring may also be referred to as a "replication group". Each shard server in the ring may be a leader of a subset of RUs, with other shard servers in the ring being followers for the subset. For example, FIG. 1 is a schematic illustration 100 of a sharded database with six shards organized according to rings two rings: (1) Shard1, Shard2, Shard3 and (2) Shard4, Shard5, Shard6. Each shard has a leader (L) and follower (F) replication units (RUs). A sharded DBMS and RUs are described in U.S. patent application Ser. No. 18/372,005, entitled Configuration and Management of Replication Units for Asynchronous Database Transaction Replication, filed on Sep. 22, 2023 by Lik Wong, et al., the entire contents of which are incorporated herein by reference.

The techniques described herein are applicable to bidirectional database replication in general, where replicas of a database are replicated respectively on a set of independent DBMSs, where each DBMS hosting a replica makes DML changes to the replica, and where the DML changes are replicated at other DBMSs in the set. With respect to DBMS making a DML change to a database replicated to other DBMSs, the DBMS and database are referred to as a source DBMS and source database with respect to the DML change. A database at which the DML change is replicated by a DBMS and its database are referred to as the destination DBMS and destination database respectively. A source DBMS and source database are analogous to a leader and its RU, respectively. A destination DBMS and destination database are analogous to a follower and its respective RU.

In an embodiment, a source and destination database may contain a set of database objects that are replicated and other database objects that are not. In such an embodiment, the set of database objects that are replicated are analogous to an RU.

3. Automatic Enforcement to Prevent Non-Compliant DML Changes

DML changes made by a leader are logically replicated at the followers. DML changes made by a leader are recorded in logical change records (LCRs), which are propagated to the followers who apply the DML changes to respective chunk replicas. An LCR represents a row change (insert, update, delete). LCRs also represent transaction directives, such as pre-commit, rollback, and partial rollback.

In one or more embodiments, when a schema upgrade is executed by a leader for a RU but not yet by a follower for the RU, the leader can automatically detect incompatible DML changes that cannot be applied or converted and applied to the old version of the table.

For example, a data type can be changed to a different data type if the two data types are compatible and existing data does not violate properties of the new data type, e.g., a VARCHAR2 column to a CHAR column. However, it is incompatible to change a NUMBER column to a VAR- CHAR2 column, a NUMBER column to a DATE column, or a DATE column to a VARCHAR2 column. As another example, a DML change to a column that has been renamed in the upgraded schema can be converted so the old name when applying the DML change to the column at a follower that has not been upgraded to the new schema.

In addition, the leader can optionally include schema upgrade attributes in the respective LCR, such as the original column name for a renamed column, the original table name for a renamed table, and so forth.

4. Asynchronous Execution of Schema Upgrades

In various embodiments, schema upgrades are asynchronously executed across shard servers in a ring, without quiescing all shards in the ring. Only the portion of users' applications accessing the shard that is executing the schema upgrade may experience downtime.

In an embodiment, each shard server has its own copy of the schema metadata in, for example, a database dictionary. Each shard server in a ring performs online schema upgrades independently and asynchronously from other shards in the ring. A shard server may be a leader for certain RUs and a follower for other RUs (as shown in FIG. 1). All RUs in a shard server share the same schema. A schema upgrade is executed against the shard hosted by the shard server, not a specific RU. A schema upgrade to a shard server in effect upgrades RUs for which the shard server is leader and follower.

Notably, in each shard server the schema upgrade is executed to produce its own local copy of the schema metadata in a database dictionary. Each shard also contains the schema metadata for foreign key and check constraints. If validation and/or data reorganization are required by a schema upgrade, multiple shard servers perform the upgrade concurrently, resulting in a faster online schema upgrade.

Once the schema upgrade is finished within a shard, the updated schema metadata in the database dictionary becomes readable for applications using that shard. In a replication system organized into rings, a schema upgrade is executed for all shards within a ring ahead of other shards in other rings. This approach allows the rolling upgrade of database schemas and applications.

5. Schema Upgrades Affecting Semantics of a Table

Schema upgrades that affect the semantics of the table can include table/column names, the presence or absence of a table/column, column types, constraints, etc.

Figure 2:
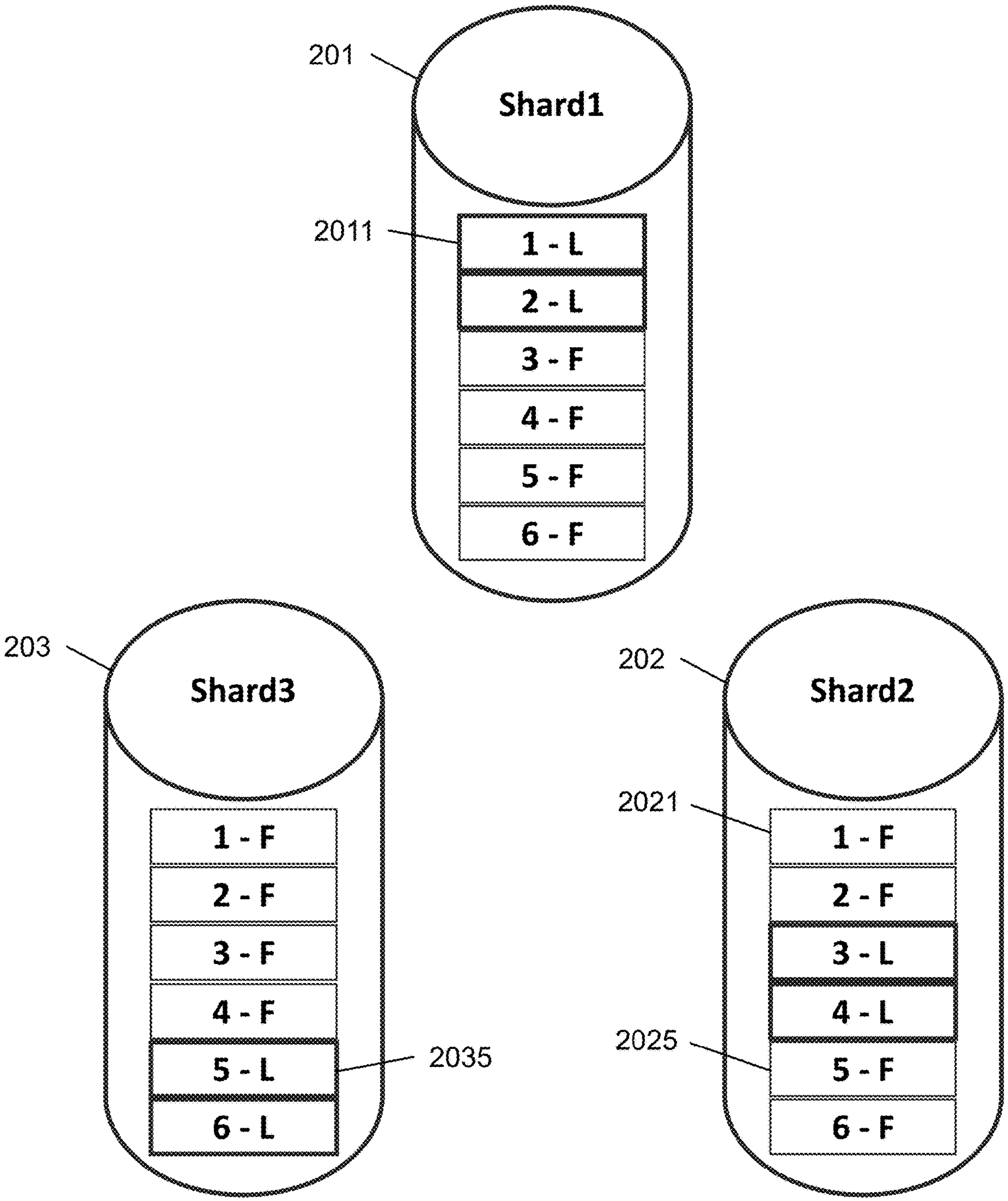
FIG. 2 schematically illustrates a Raft-based distributed database in which each shard can be a leader for a Replication Unit and a follower for another Replication Unit, in accordance with an embodiment of the disclosure.

In one or more embodiments, each shard can be a leader for some RUs and a follower for another RU, as schematically illustrated in FIG. 2. FIG. 2 is an illustration 200 of a ring including three shards 201-203, in which each shard hosted by leaders/followers of six RUs. For each schema upgrade being executed across shards, two cases can exist during a schema upgrade window:

Case (I): The schema upgrade is executed first at a leader for an RU but not yet at a follower for the same RU, e.g., RU 1;

Case (II): The schema upgrade is executed first at follower for an RU but not yet at the leader in the RU, e.g., RU 5.

During the schema upgrade window, if a follower becomes the new leader and the old leader becomes a follower (role swapping), Case (I) often becomes Case (II), and vice versa. A leader can automatically detect illegal DML change operations under the version of a table; compliance can be enforced locally at the row level or at the partition level. For example, a table is altered by adding column with a default value. The leader prohibits inserts of the column that insert non-default, as the old schema does not have this column and the non-default values may be lost after replicating to a follower with the old schema.

In additional embodiments, convertible schema upgrades are schema changes for which an apply process can seamlessly process an LCR representing a DML change to the previous version of a table and apply to an upgraded version of the table under the upgraded schema, and vice versa. Most of the schema upgrades can be automatically enforced and converted while the replicated database system is online. The term "new LCRs" refer to LCRs generated by the leader after the execution of a schema upgrade in a particular shard. The operations specified for Case(I) and Case(II) are performed during the schema upgrade window.

6. Row-Level Enforceable and Convertible Schema Upgrades

In various embodiments, a schema upgrade can be locally enforceable (i.e., non-compliant DML changes are locally preventable) when rows are being inserted/updated/deleted at the leader, or automatically convertible by an apply procedure at the follower, as detailed below for various scenarios. In each scenario, the measures undertaken are described for Case (I) and Case (II).

1. Adding a column with a default value
   - I) The leader blocks the insert/update of this column with non-default values; the apply at the followers ignores this extra column in the new LCRs.
   - II) There is no special handling required as the new LCRs for this table do not contain this column. The apply does not include this column in its DML changes, resulting in the default value for this column in the database for inserts.
2. Adding a column without a default value. This is treated as adding a column with a default value of null, as null is used for the new column for existing rows in the table. A not-null constraint cannot be specified if the table is not empty.
3. Making a column invisible
   - a. If the new LCRs for this table do not contain this column, the apply does not include this column in its DML changes, resulting in the default value for this column being inserted in the database. The default value is null if a default value is not explicitly defined.
   - b. No special handling is required. The apply process continues to refer to this column as usual if it is in the LCRs.
4. Renaming a column
   - a. The new LCRs contain both the old and new column names for this column. The apply uses the old column name instead of the new column name.
   - b. The LCRs from the leader only contain the original column name as there is no such new column in the shard containing the leader. The apply maps the original column to the renamed column for DML changes and applies DML changes to the column using the original column name.
5. Renaming a table
   - a. The new LCRs from the leader contain both the old and new table names for this table. The apply uses the original table name instead of the new table name.

b. The LCRs from the leader only contain the original table name. The apply maps the original table to the renamed new table for DML changes.
6. Dropping a table
a. There will be no more LCRs for this table in the leader, hence no impact on the follower.
b. The apply discards the LCRs for this table from the leader or otherwise ignores any DML change to the dropped table when processing the LCR.
7. Dropping a (sub)partition
a. There will be no new LCRs in the dropped (sub) partition from the leader, hence no impact on the follower.
b. The apply ignores DML changes to the dropped (sub) partition.
8. Dropping a column: This may not be an online operation in each local shard but does not require a barrier or quiescing of all shards or a set of shards in a given ring, i.e., draining and applying all in-flight transactions in relevant shards. The alternative is to make the column invisible instead, which is online in a local shard. This schema change impacts existing rows in the table.
a. The new LCRs for this table do not contain this column. The apply does not include this column in its DML changes, resulting in a default value for this column when inserting a row into the table. The default value is null if a default value is not explicitly defined. If there is a not-null constraint on this column, the apply process raises an error (e.g. not-null constraint violation) when inserting a row into the table and the apply process pauses. When the drop column schema upgrade is executed in this follower, the apply process resumes execution. A role swapping may force the execution of the drop column schema upgrade in the follower if needed.
b. The apply ignores this extra column in the LCRs from the leader.
9. Changing column data type that has a larger maximum size: this schema change will not lose data. Examples include VARCHAR2(20) to VARCHAR2(50), DATE to TIMESTAMP, RAW to BLOB, and increasing the precision or scale of a numeric type.
a. The leader validates that the new value still enforces the original column size.
b. No special handling is necessary.

7. Row-Level Enforceable Schema Upgrades Adding Column Constraints

In various embodiments, in Case (I), the leader prevents non-compliant DML changes at the row level. In Case (II), the leader is still using the old schema but blocks non-compliant DML changes at the row level using the schema upgrade attributes. Such schema changes can include adding row-level enforceable check constraints with simple expressions; for example:

ALTER TABLE Emp ADD CONSTRAINT check_SalaryPositive CHECK (Salary>=0);

ALTER TABLE Emp ADD CONSTRAINT check_DifferentNames CHECK (FirstName !=LastName);

ALTER TABLE Emp ADD CONSTRAINT check_ValidFirstName CHECK (REGEXP_LIKE(FirstName, '^[A-Z]'));

ALTER TABLE Emp ADD CONSTRAINT check_ValidEmployeeID CHECK (EmployeeID NOT IN (SELECT EmployeeID FROM TerminatedEmployees));

ALTER TABLE Emp ADD CONSTRAINT check_hire_date CHECK (hire_date>=TO_DATE('2010-01-01', 'YYYY-MM-DD')

ALTER TABLE Order ADD CONSTRAINT check_total_amount CHECK (total_amount>0 AND plsql_function1(total_amount))

In further embodiments, compatible column data type modifications can be performed without data loss; annotated examples are shown in FIG. 3. Examples 301 and 302 refer to creating a table and a row in a table, respectively. Data type modifications can also include changing the data type to a smaller size; this is only compatible if the existing data in the column is smaller than the new data type, e.g., changing a VARCHAR2(50) column to a VARCHAR2(20) column is allowed if all of the existing data in the column is 20 characters or less (compare examples 303 and 304).

In additional embodiments, a data type can be changed to a different data type if the two data types are compatible and existing data does not violate the new data types, e.g., a VARCHAR2 column to a CHAR column. However, it is incompatible to change a NUMBER column to a VARCHAR2 column (see example 305), a NUMBER column to a DATE column (see example 306), or a DATE column to a VARCHAR2 column (see example 307).

8. Partition-Level Enforceable Schema Upgrades

In additional embodiments, a unique index may be created and/or a unique constraint may be added; for example:

ALTER TABLE Cust ADD CONSTRAINT uk_Name UNIQUE (FirstName, LastName);

This unique index includes the partition key for the partition. Before the unique index is created in a shard containing a leader, the leader can enforce the uniqueness at the partition level using this procedure:

(1) For each index value in the modification set that may be created in this shard: lock (table, index_values)
(2) Raise an error if a query based on the given index_values returns one or more rows.
(3) Let the transaction commit
(4) Release all locks obtained in step (1) above 9. Schema Upgrade: Execution Steps In various embodiments, a schema is maintained at the shard server level, and each shard server can be a leader for some RUs and a follower for other RUs. One of the shard servers, coordinates the schema upgrade executions in all the shards. The user specifies the execution to all shards or a subset of interconnected shards (a list of replication units).

Figure 4:
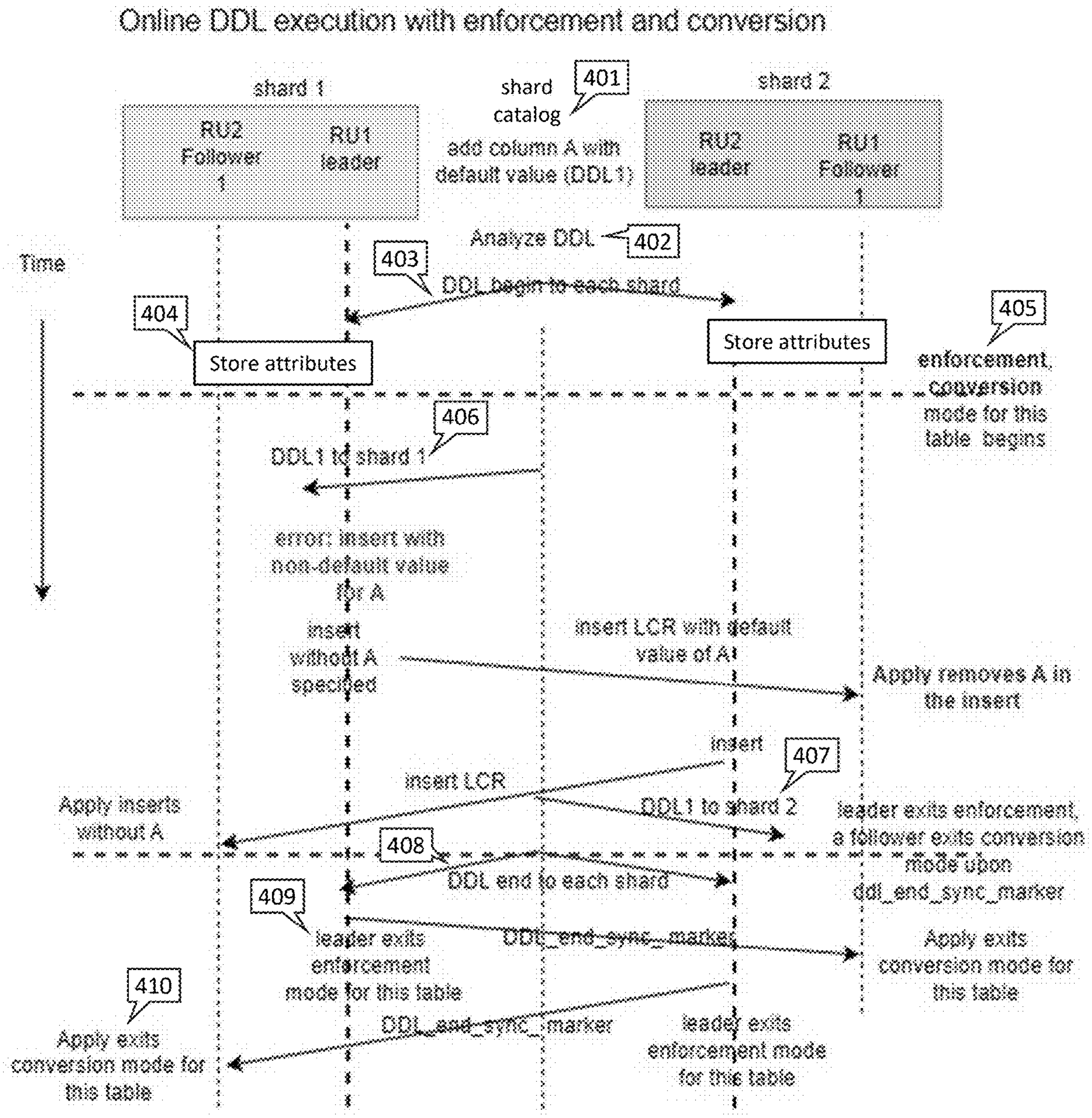
FIG. 4 is a chart illustrating data definition language (DDL) execution steps for a schema upgrade in a Raft-based distributed database, in accordance with embodiments of the disclosure.

FIG. 4 is a chart 400 illustrating execution steps for a schema upgrade in a replicated sharded DBMS, in accordance with embodiments of the disclosure. In step 401, a user connects to the shard server coordinating the schema upgrades and requests a schema upgrade in all shards or a subset of shards that are interconnected, or a list of RUs. The coordinating shard server generates a request identifier (i.e., ddl_id), and identifies the related attributes for the schema upgrade (step 402). These attributes can include, for example: (a) database object name (including the owner); (b) new database object name (e.g., rename table); (c) database object type (e.g., table, index); (d) reference database object name (e.g., create an index, where the reference database object is its table); (e) operation type (e.g., add column); (f) column, column data type, column width, default value, etc.; (g) new column name, data type (e.g., rename column, modify column data type); (h) constraints and constraint conditions; (i) partition name.

In step 403, the coordinating shard server stores the attributes locally, sends those attributes to each available shard per the user's specification, and delivers a DDL_begin (ddl_id) message to each shard, which relays this message to both the followers and leaders in the shard. Messages are queued for unavailable shard servers. In particular embodiments, a DDL_begin marker triggers each shard to handle the upcoming schema upgrade execution locally; this may include processes such as enforcement and conversion. The DDL_begin marker can also facilitate the handing of a down shard server during the schema upgrade execution.

Each shard server stores the schema upgrade attributes in its data dictionary (step 404) and caches the information in a shared memory. Each RU then reads the attributes. The leader of a RU enters into the enforcement mode while the apply for a follower enters into the conversion mode (step 405). In the enforcement mode, a RU leader guards against DML changes that are incompatible to the old schema if the schema upgrade has been executed in the shard. The leader can include relevant schema upgrade attributes in the LCRs in Case (I) when specified. In the conversion mode, the apply in a follower seamlessly converts an LCR from the old version of the table being applied to a new version of the table and vice versa.

Once all available shard servers per user specification have entered the enforcement/conversion mode, the coordinating shard server executes the schema upgrade in each shard asynchronously (steps 406, 407). When a shard executes a schema upgrade, it enqueues a DDL_begin_sync_marker(ddl_id) for each RU leader. This DDL_begin_sync_marker allows a follower Apply to enter the conversion mode during shard recovery if this shard had been unavailable during the schema upgrade execution. After executing the schema upgrade, the shard enqueues a DDL_end_sync_marker(ddl_id). This DDL_end_sync_marker allows a follower Apply to exit the conversion mode.

Once the schema upgrade has been executed successfully in all available shards, the coordinating shard server sends a DDL_end(ddl_id) message to the leaders of available shards per the user specification (step 408). The catalog database queues this request for unavailable shards. In step 409, upon receiving the DDL_end(ddl_id) message, each RU leader enqueues ddl_end(ddl_id) in the LCR stream and exits its enforcement mode for this table. When a follower receives the ddl_end(ddl_id) LCR from the LCR stream, it exits the conversion mode for this table (step 410).

10. Shard Recovery

An unavailable shard server generally is not generally unavailable across two or more pending schema upgrade requests. In an embodiment, an unavailable shard server (also referred to herein as a down shard server) can be removed from the replicated sharded DBMS.

When a down shard server recovers, it retrieves pending requests from its incoming queue. For a ddl_begin(ddl_id) message, it also gets the attributes associated with this request and stores them in its metadata. Apply procedures in this shard server enter conversion mode. Each follower processes LCR streams from its leader. For a DDL_begin_sync_marker(ddl_id) LCR, this Apply enters into conversion mode if has not already done so.

When a follower encounters a DDL_end_sync_marker (ddl_id) LCR, it waits for other followers to reach ddl_end_sync_marker(ddl_id). The last follower receiving the DDL_end_sync_marker LCR executes the schema upgrade locally. Once a follower is close to catching up, it can rejoin its RU.

11. Enforcement and Conversion Process

Figure 5:
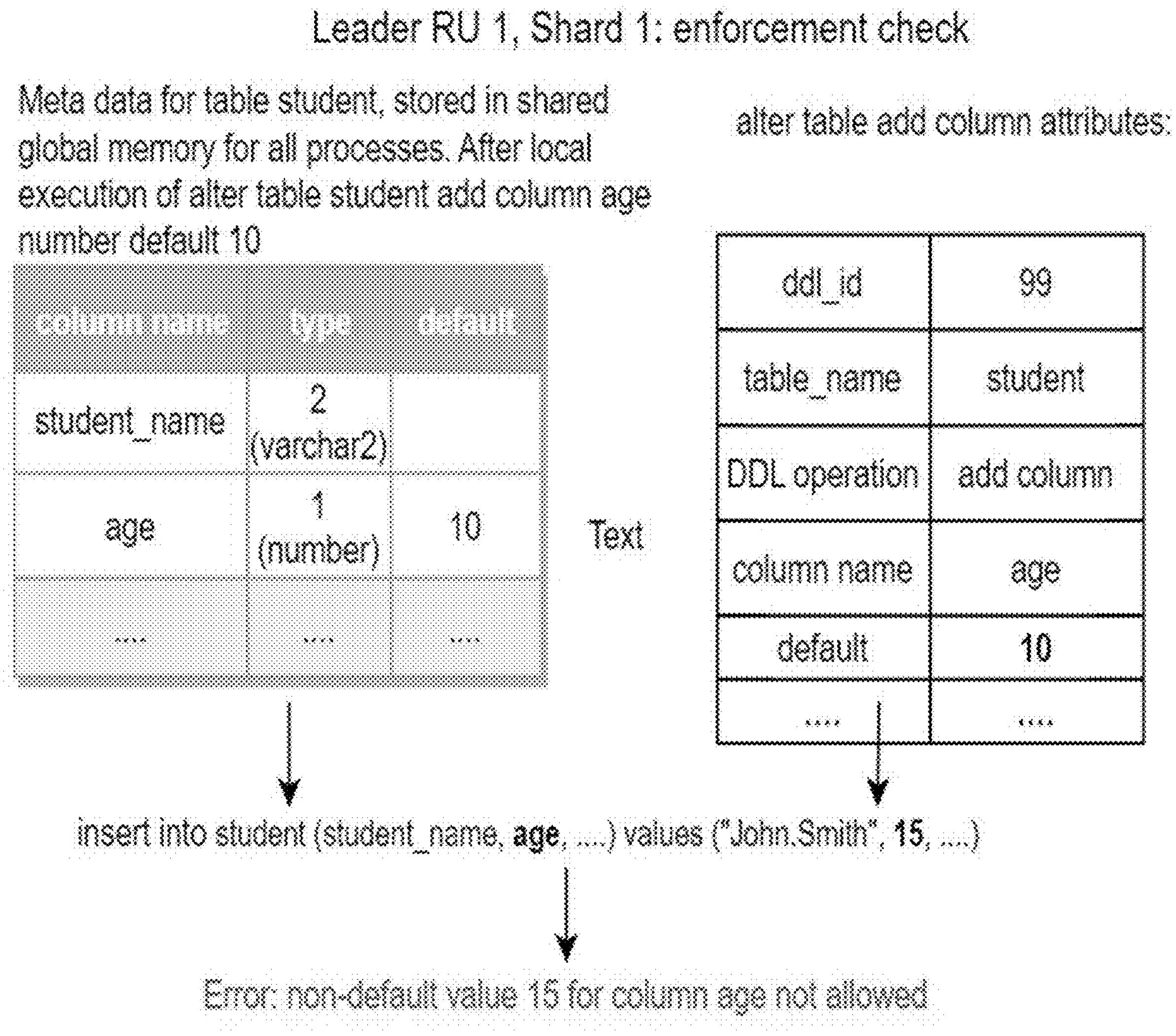
FIG. 5 schematically illustrates an enforcement check for a leader shard in a replication unit, in accordance with an embodiment of the disclosure.

FIG. 5 is a schematic illustration 500 of an enforcement check for a leader of an RU, in accordance with an embodiment of the disclosure. Each shard server caches the database schema metadata and related attributes in a shared data structure. For Case (I), upon receiving a change, the leader in the shard server verifies that the change conforms to the old schema, or raises an error. In FIG. 5, for example, a schema upgrade comprises adding a column with a default value of 10, which is executed in shard server 1, the leader for RU1. An insert with a non-default value of 15 results in an error.

Figure 6:
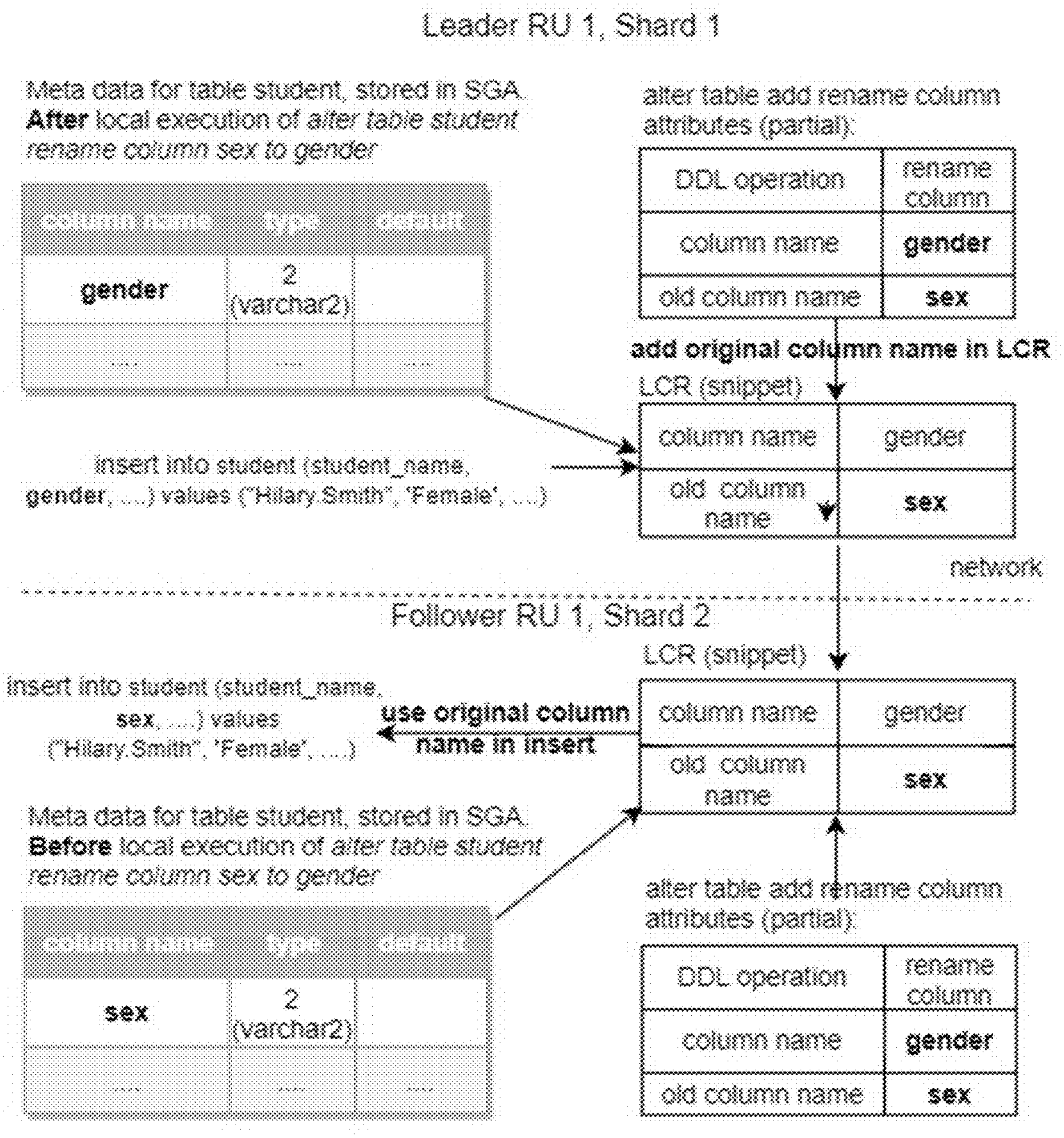
FIG. 6 depicts a procedure in which a leader in a shard adds information to a logical change record (LCR), in accordance with embodiments of the disclosure.

FIG. 6 depicts a procedure 600 in which a leader in a shard adds information to a logical change record (LCR), in accordance with embodiments of the disclosure. Upon receiving a change, the leader adds additional information in the LCR based on the schema upgrade attributes in Case (I), e.g., including the original column name, original table name, etc. The apply procedure converts an LCR based on its local metadata for the table (schema) and the attributes, such as using the original column and/or original table name, dropping an extra column, and the like. The additional attributes in the LCRs, e.g., original column name, are optional as the Apply has a copy of the attributes. For some schema upgrades, e.g., drop a partition, the Apply can discard the partition not found error in the conversion mode for drop a partition schema upgrade.

12. Alternatives and Extensions

One or more of the functions attributed to any process described herein, according to one or more embodiments, may be performed any other logical or physical entity, according to one or more embodiments. In various embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

13. DBMS Overview

A database management system (DBMS) manages a database. A DBMS may comprise one or more database servers. A database comprises database data and a database dictionary that is stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. Changes made to database data, such in response to a DML command, are referred to herein as DML changes. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, a branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

14. Hardware Overview

An application or database server instance runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 6, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
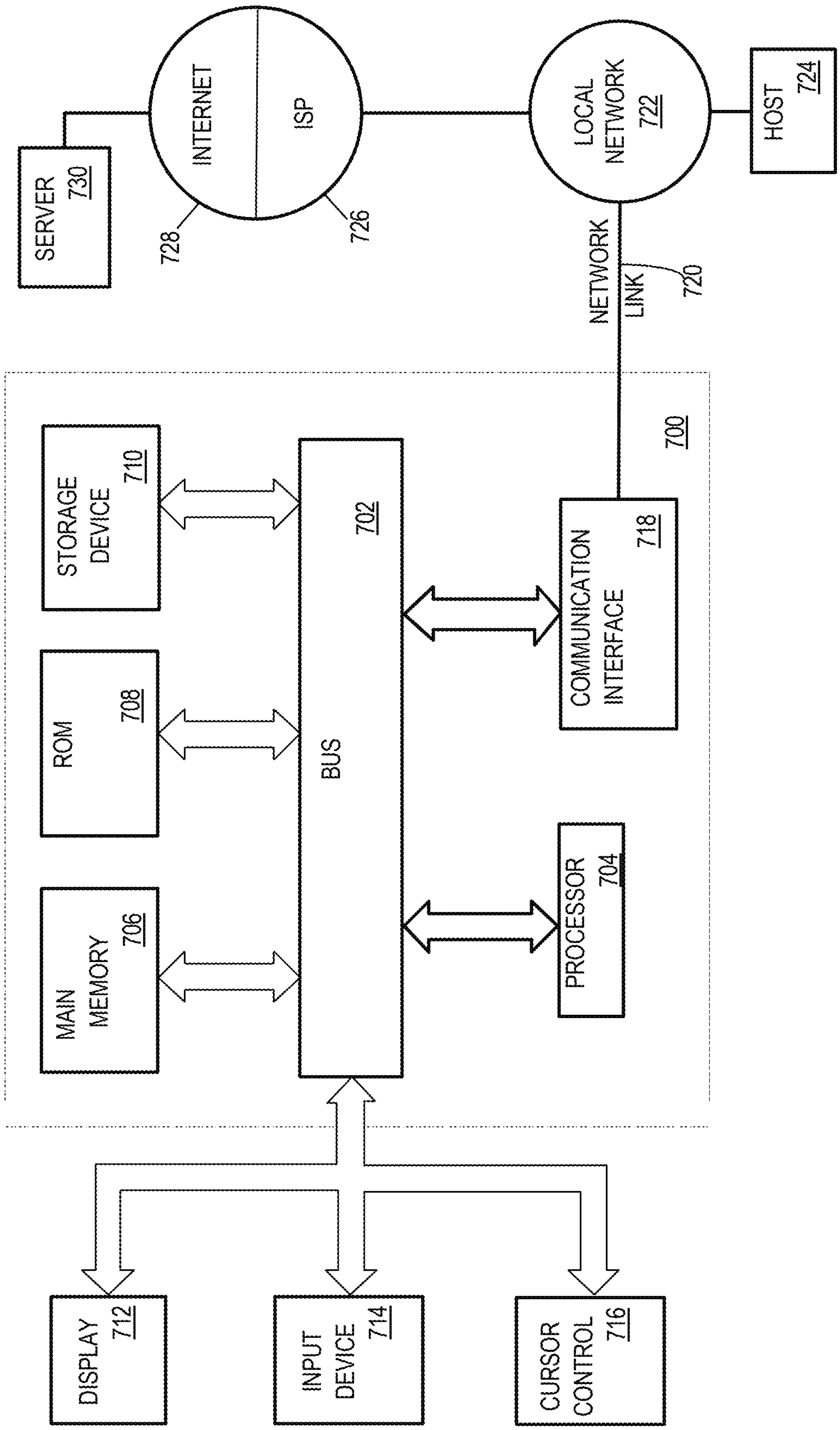
FIG. 7 is a block diagram that illustrates a computer system upon which an embodiment of the invention may be implemented.

For example, FIG. 7 is a block diagram that illustrates a computer system 700 upon which various embodiments of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

15. Software Overview

Figure 8:
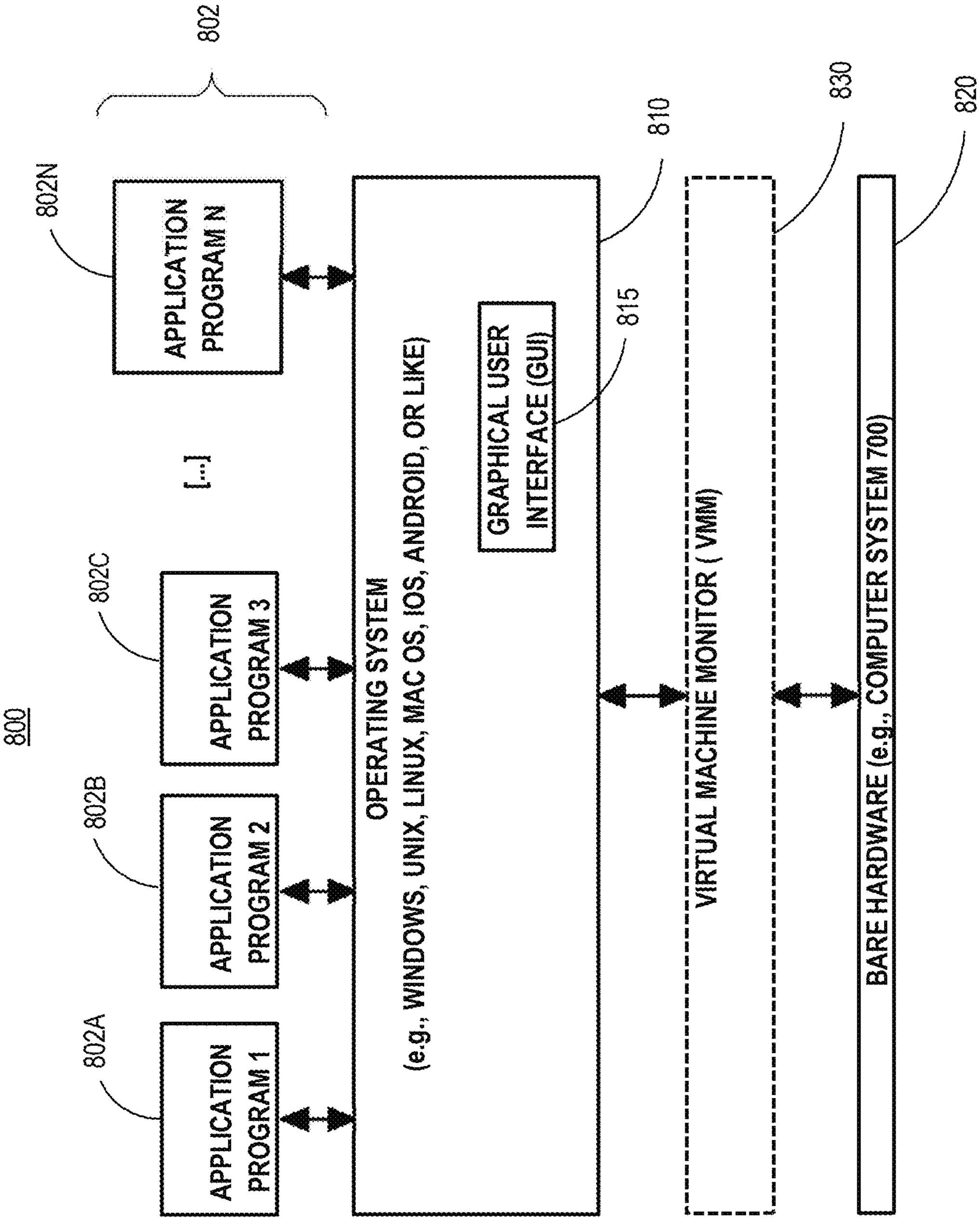
FIG. 8 is a block diagram of a basic software system that may be employed for controlling the operation of a computer system upon which an embodiment of the invention may be implemented.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

16. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (Saas), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving a request for a schema upgrade in a replicated database system comprising a first database server hosting a first replica in a first database and a second database server hosting a second replica within a second database, wherein the schema upgrade changes a first version of a database schema that defines one or more database objects stored in the first database to a second version of the database schema;

performing the schema upgrade asynchronously, resulting in the second database being upgraded to the second version before the first database is upgraded to the second version; and during a schema upgrade window in which the schema upgrade of the first database is not completed:

said first database server executing a first data manipulation language (DML) change against the first replica, said first DML change specifying a first change to a particular database object;

generating a first logical change record (LCR) that specifies said first DML change;

applying by said second database server said first LCR against said second replica;

said second database server executing a second DML change against the second replica, said second DML change specifying a second change to said particular database object;

generating a second LCR that specifies said second DML change;

applying by said first database server said second LCR against said first replica; and said second database server preventing a third DML change against said second replica in response to determining that said third DML change is incompatible with the first version of the database schema.

2. The method of claim 1, wherein the schema upgrade adds a new table column that is not defined by said first version and for which a default column value is defined by the second version, wherein said second DML change inserts a row into a table for which the new table column is defined by the second version.

3. The method of claim 2, wherein during said schema upgrade window, said second database server preventing executing of a DML change that sets said new table column to a column value different than said default column value.

4. The method of claim 1, wherein said first version defines a first name of a table column and said second version specifies a second name for said table column different than said first name, where said second DML change modifies said table column using said second name, wherein said first database server applies said second DML change using said first name.

5. The method of claim 1, wherein said first version defines a first name of a table column and said second version specifies a second name for said table column different than said first name, where said first DML change modifies said table column using said first name, wherein said second database server applies said first DML change using said second name.

6. The method of claim 1, wherein said first version defines a first name of a table and said second version specifies a second name for said table different than said first name, wherein said second DML change modifies said table using said second name, wherein said first database server applies said second DML change using said first name.

7. The method of claim 2, wherein said first version defines a first name of a table and said second version specifies a second name for said table different than said first name, wherein said first DML change modifies said table using said first name, wherein said second database server applies said first DML change using said second name.

8. The method of claim 1, wherein:

the schema upgrade drops a certain database object in said second version;

the method further includes:

said first database server executing another DML change against the first replica, said another DML change specifying another change to said certain database object;

said first database server generating another LCR that specifies said another DML change;

said second database server ignoring said another DML change when processing said another LCR.

9. The method of claim 1, wherein:

the schema upgrade drops a table;

the method further includes:

said first database server executing another DML change against the first replica, said another DML change specifying another change to said table;

said first database server generating another LCR that specifies said another DML change;

said second database server ignoring said another DML change when processing said another LCR.

10. The method of claim 1, wherein:

the schema upgrade drops a table column of a table;

the method further includes:

said first database server executing another DML change against the first replica, said another DML inserting a row into said table;

said first database server generating another LCR that specifies said another DML change;

said second database server inserting said row into said table, said inserting including inserting a default value into said table column.

11. The method of claim 1, wherein:

the schema upgrade drops a table column of a table;

the method further includes:

said first database server executing another DML change against the first replica, said another DML change inserting a row into said table;

generating another LCR that specifies said another DML change;

said second database server encountering a not-null constraint violation when applying said another LCR in response to encountering a not-null constraint violation, said second database server pausing applying LCRs from said first database server during said schema upgrade window.

12. The method of claim 1, wherein:

said first version defines a first size of a table column and said second version defines a second size for said table column larger than said first size;

said second DML change changes said table column;

wherein said second database server enforces said first size for said table column when making said second DML change.

13. The method of claim 1, wherein:

said schema upgrade adds a constraint to a table column of a table;

said first DML change changes said table column; and said first database server enforcing said constraint for said table column when making said first DML change.

14. The method of claim 1, wherein said second version of the database schema defines a new constraint on said particular database object; and where said first database system checks said new constraint when executing said first DML change.

15. One or more non-transitory storage media storing sequences of instructions that, when executed by one or more computing devices, cause:

receiving a request for a schema upgrade in a replicated database system comprising a first database server hosting a first replica in a first database and a second database server hosting a second replica within a second database, wherein the schema upgrade changes a first version of a database schema that defines one or more database objects stored in the first database to a second version of the database schema;

performing the schema upgrade asynchronously, resulting in the second database being upgraded to the second version before the first database is upgraded to the second version; and during a schema upgrade window in which the schema upgrade of the first database is not completed:

said first database server executing a first data manipulation language (DML) change against the first replica, said first DML change specifying a first change to a particular database object;

generating a first logical change record (LCR) that specifies said first DML change;

applying by said second database server said first LCR against said second replica;

said second database server executing a second DML change against the second replica, said second DML change specifying a second change to said particular database object;

generating a second LCR that specifies said second DML change;

applying by said first database server said second LCR against said first replica; and said second database server preventing a third DML change against said second replica in response to determining that said third DML change is incompatible with the first version of the database schema.

16. The one or more non-transitory storage media of claim 15, wherein the schema upgrade adds a new table column that is not defined by said first version and for which a default column value is defined by the second version, wherein said second DML change inserts a row into a table for which the new table column is defined by the second version.

17. The one or more non-transitory storage media of claim 16, wherein the one or more sequences of instructions include instructions, that when executed by one or more computing devices, cause during said schema upgrade window, said second database server preventing executing of a DML change that sets said new table column to a column value different than said default column value.

18. The one or more non-transitory storage media of claim 15, wherein said first version defines a first name of a table column and said second version specifies a second name for said table column different than said first name, where said second DML change modifies said table column using said second name, wherein said first database server applies said second DML change using said first name.

19. The one or more non-transitory storage media of claim 15, wherein said first version defines a first name of a table column and said second version specifies a second name for said table column different than said first name, where said first DML change modifies said table column using said first name, wherein said second database server applies said first DML change using said second name.

20. The one or more non-transitory storage media of claim 15, wherein said first version defines a first name of a table and said second version specifies a second name for said table different than said first name, wherein said second DML change modifies said table using said second name, wherein said first database server applies said second DML change using said first name.

21. The one or more non-transitory storage media of claim 16, wherein said first version defines a first name of a table and said second version specifies a second name for said table different than said first name, wherein said first DML change modifies said table using said first name, wherein said second database server applies said first DML change using said second name.

22. The one or more non-transitory storage media of claim 15, wherein:

the schema upgrade drops a certain database object in said second version;

wherein the one or more sequences of instructions include instructions, that when executed by one or more computing devices, cause:

said first database server executing another DML change against the first replica, said another DML change specifying another change to said certain database object;

said first database server generating another LCR that specifies said another DML change;

said second database server ignoring said another DML change when processing said another LCR.

23. The one or more non-transitory storage media of claim 15, wherein:

the schema upgrade drops a table;

wherein the one or more sequences of instructions include instructions, that when executed by one or more computing devices, cause:

said first database server executing another DML change against the first replica, said another DML change specifying another change to said table;

said first database server generating another LCR that specifies said another DML change;

said second database server ignoring said another DML change when processing said another LCR.

24. The one or more non-transitory storage media of claim 15, wherein:

the schema upgrade drops a table column of a table;

wherein the one or more sequences of instructions include instructions, that when executed by one or more computing devices, cause:

said first database server executing another DML change against the first replica, said another DML inserting a row into said table;

said first database server generating another LCR that specifies said another DML change;

said second database server inserting said row into said table, said inserting including inserting a default value into said table column.

25. The one or more non-transitory storage media of claim 15, wherein:

the schema upgrade drops a table column of a table;

wherein the one or more sequences of instructions include instructions, that when executed by one or more computing devices, cause:

said first database server executing another DML change against the first replica, said another DML change inserting a row into said table;

generating another LCR that specifies said another DML change;

said second database server encountering a not-null constraint violation when applying said another LCR in response to encountering a not-null constraint violation, said second database server pausing applying LCRs from said first database server during said schema upgrade window.

26. The one or more non-transitory storage media of claim 15, wherein:

said first version defines a first size of a table column and said second version defines a second size for said table column larger than said first size;

said second DML change changes said table column;

wherein said second database server enforces said first size for said table column when making said second DML change.

27. The one or more non-transitory storage media of claim 15, wherein:

said schema upgrade adds a constraint to a table column of a table;

said first DML change changes said table column; and said first database server enforcing said constraint for said table column when making said first DML change.

28. The one or more non-transitory storage media of claim 15, wherein said second version of the database schema defines a new constraint on said particular database object; and where said first database system checks said new constraint when executing said first DML change.

* * * * *